NEGATIVE REISTANCE CIRCUIT UNIT AND CIRCUITS THEREFOR

Filed Feb. 28, 1961 4 Sheets-Sheet 1

Inventors
Junichi Yasuda
Motomu Tadama by Hill, Sherman, Meroni, Gross & Simpson Attys.

Inventors
Junichi Yasuda
Motomu Tadama by Hill, Sherman, Meroni, Gross & Simpson Attys.

NEGATIVE REISTANCE CIRCUIT UNIT AND CIRCUITS THEREFOR
Filed Feb. 28, 1961 4 Sheets-Sheet 3
Fig-9
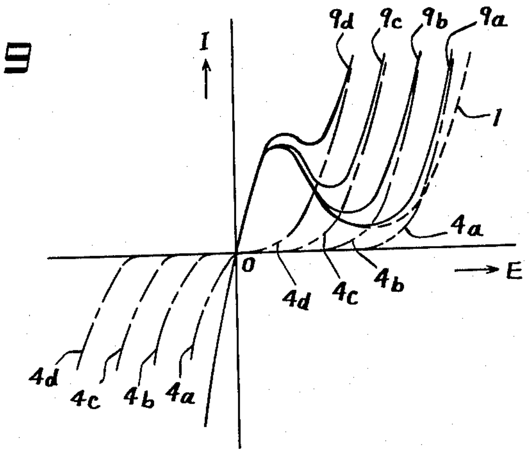
Fig-10
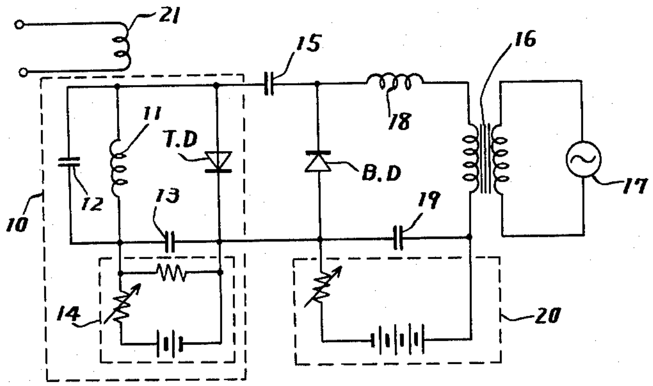
Fig-11 Fig-12
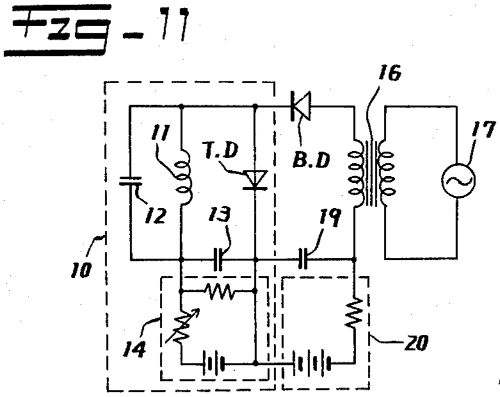
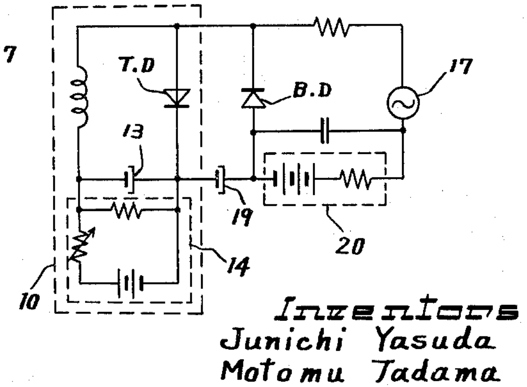
Inventors
Junichi Yasuda
Motomu Tadama
by Hill, Sherman, Meroni, Gross & Simpson Attys.

NEGATIVE REISTANCE CIRCUIT UNIT AND CIRCUITS THEREFOR

Filed Feb. 28, 1961

4 Sheets-Sheet 4

Inventors
Junichi Yasuda
Motomu Tadama by Hill, Sherman, Meroni, Gross & Simpson Attnys.

United States Patent Office 3,225,317
Patented Dec. 21, 1965

3,225,317

NEGATIVE RESISTANCE CIRCUIT UNIT AND CIRCUITS THEREFOR

Junichi Yasuda and Motomu Tadama, Tokyo, Japan, assignors to Sony Corporation, Tokyo, Japan, a corporation of Japan Filed Feb. 28, 1961, Ser. No. 92,396
Claims priority, application Japan, Mar. 4, 1960, 35/7,168
14 Claims. (Cl. 332—52)

This invention relates to a novel negative resistance circuit unit and circuits therefor and more particularly to a circuit unit comprising a tunnel diode and a backward diode.

One principal object of this invention is to provide a negative resistance unit comprising a tunnel diode and a backward diode, the resultant characteristic of which is varied with the bias voltages of the backward diode.

Another object of this invention is to provide a negative resistance unit which may be employed in various electrical circuits such as in an oscillator, amplifier, modulator, frequency converter or the like.

Other objects, features and advantages of this invention will become fully apparent from the following description taken in connection with the accompanying drawings, in which:

FIGURE 9 shows resultant characteristic curves of the circuit shown in FIGURE 8;

FIGURE 10 illustrates an embodiment of this invention applied to a modulator;

FIGURE 11 illustrates an embodiment of this invention applied to another modulator;

FIGURE 12 illustrates an embodiment of this invention applied to another modulator;

A tunnel diode is a semiconductor diode with an extremely narrow transition region at its junction and which has a negative conductance characteristic over a range of forwardly applied voltages. If the tunnel diode is combined with an element B having a constant-voltage characteristic, a two-terminal or multi-terminal unit with different negative resistance characteristics may be obtained.

Figure 1:
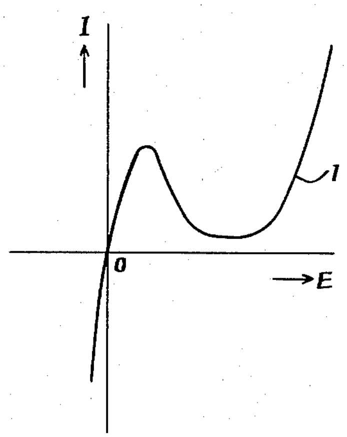
FIGURE 1 is a characteristic curve of a tunnel diode employed in this invention.

The characteristic of a tunnel diode is exemplified by curve 1 as shown in FIGURE 1 where forwardly applied voltages are on the right and reversely applied voltages are shown to the left. Normal direction of current flow is shown as positive values and reverse current flow is shown by the negative values. The tunnel diode is an element of very high impurity density and differs radically from a conventional semi-conductor diode in that its conductance is greater in a backward direction than in a forward direction as shown in FIGURE 1.

Figure 2:
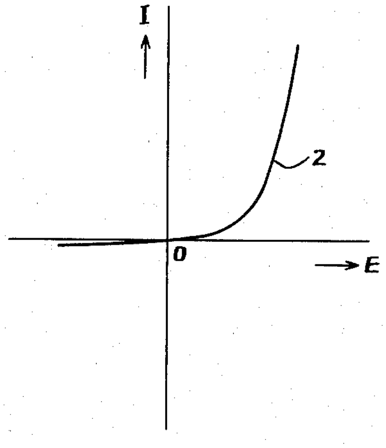
FIGURE 2 is a characteristic curve of an element which generally has a constant-voltage characteristic.
Figure 4:
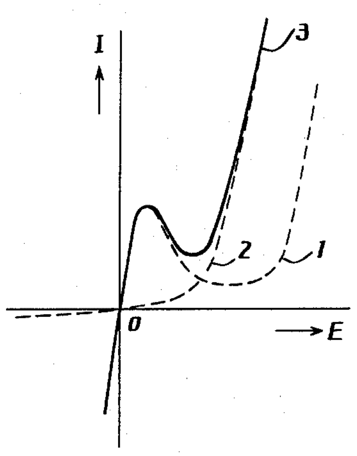
FIGURE 4 is a resultant characteristic curve of the circuit shown in FIGURE 3.
Figure 3:
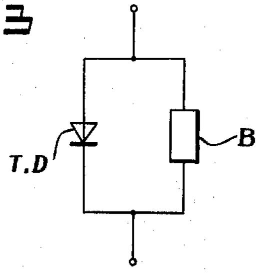
FIGURE 3 is a parallel circuit diagram of a constant-voltage characteristic element and a tunnel diode for explaning this invention.

A non-linear element with a constant-voltage characteristic is shown by the rectification characteristic curve 2 as shown in FIGURE 2. Now, if these two elements, a tunnel diode TD and B are connected in parallel to each other, as shown in FIGURE 3, a negative resistance characteristic curve as shown in a curve 3 of FIGURE 4 may be obtained which is different from the negative resistance characteristic curve 1 shown in FIGURE 1.

Figure 5:
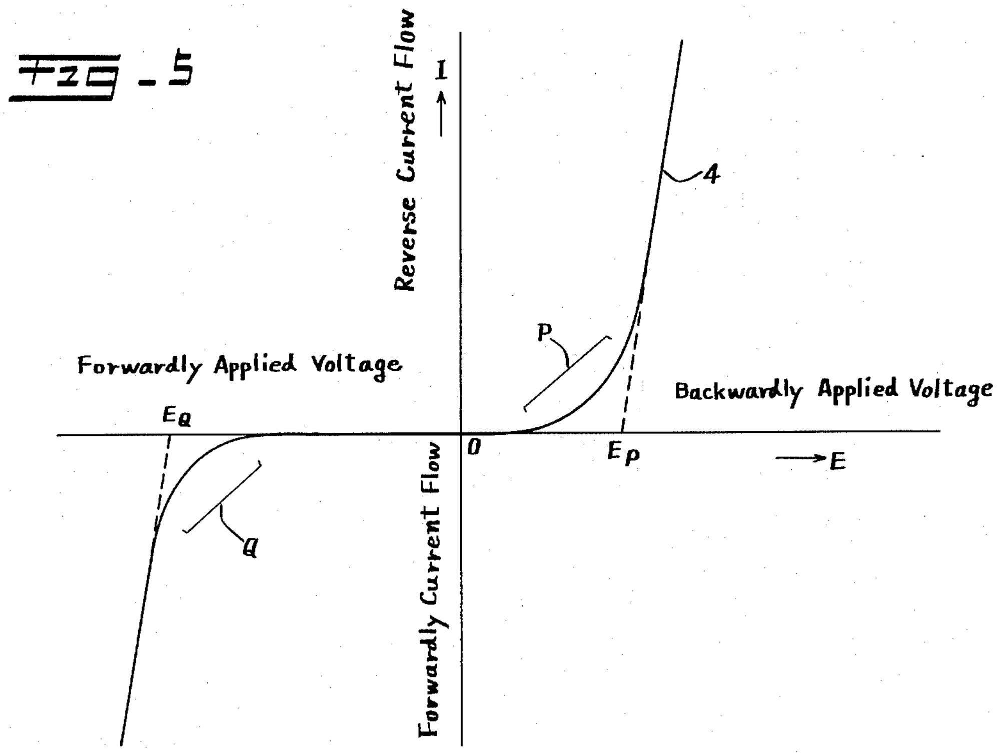
FIGURE 5 is a characteristic curve of a backward diode.

In this invention, a backward diode, which is indicated generally by the notation BD in the drawing is employed as a constant voltage characteristic element. This backward diode like a tunnel diode is an element of very high impurity density. A backward diode is an abrupt P-N junction type diode having an effective impurity concentration of greater than $10^{18}$ impurities per cubic centimeter on both sides of the junction and in which the length of transition region is of the order of 200 Angstroms or less. It shows a substantially constant-voltage characteristic in both the positive and negative regions as shown by the curve 4 in FIGURE 5 wherein reversely applied voltages are shown to the right and may conveniently be considered as negatively applied voltages and wherein reversely directed current flow is in the upper half of the graph. It should be noted that the graph of FIGURE 5 is drawn with a cartesian plane rotated through 180° from conventional notation for the convenience of subsequent discussion and illustration.

When a backward diode is used in its reverse direction region a greatly improved result is attained since it has the following advantages:

(1) A strong non-linear characteristic may be made more easily in the characteristic region P of the reverse direction than in a characteristic region Q of the forward direction.

(2) The region P is much less effected by temperature variations than is the region Q.

(3) In the region Q there are noises peculiar to a semiconductor diode which results for excess current, but in the region P noises are very few other than those due to a saturation current, this being as little or less than that found in a tunnel diode.

(4) A voltage $E_P$ of a rising point presenting the reverse direction characteristic may be easily made over a very broad range from zero volts, but a voltage $E_Q$ of a rising point in the forward direction may not be changed as much. The reverse direction characteristic region is superior in all respects to the forward direction region of an ordinary diode. In the case where an amplifier, oscillator, converter or the like is formed by combining the backward diode and tunnel diode properly, it is preferable to use the reverse direction region, for here there is substantially no noise due to the temperature variation or excess current. In this invention, accordingly, the backward diode is connected in its reverse direction to a tunnel diode.

Figure 6:
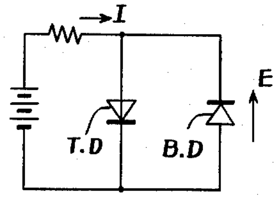
FIGURE 6 is a circuit diagram for explaining fundamentally a negative resistance unit according to this invention.
Figure 7:
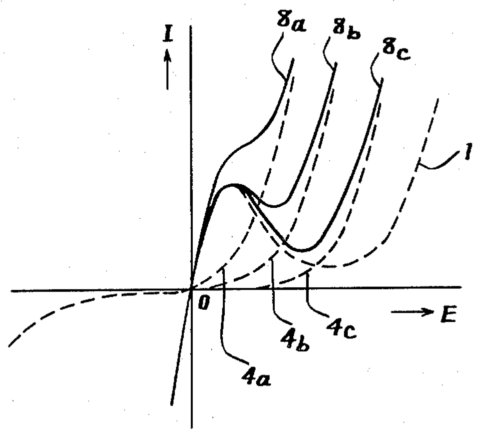
FIGURE 7 shows resultant characteristic curves of the circuit shown in FIGURE 6.
Figure 8:
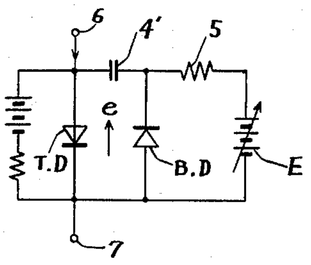
FIGURE 8 is a fundamental circuit diagram of a negative resistance unit according to this invention.

Now, in the case where the tunnel diode is connected in parallel with the above-mentioned backward diode as shown in FIGURE 6, and characteristics curves such as shown in FIGURE 7 result. That is, respectively different characteristic curves *8a*, *8b* and *8c* may be obtained by using backward diodes of different characteristics respectively. If, as shown in FIGURE 8, the tunnel diode and backward diode are connected through a capacitor 4′ to be separated with respect to direct current from each other and to the backward diode is connected a variable voltage power source E through, for example, a resistor 5 to give a bias voltage different from that of the tunnel diode, the resultant characteristics curves with respect to alternating current between two terminals 6 and 7 of the tunnel diode may freely be changed as shown by curves 9*a*, 9*b*, 9*c* and 9*d* in FIGURE 9 from the negative resistance characteristic curve, by varying the bias of the backward diode.

Making use of the aforementioned characteristics, various applications may be effected.

(1) If the backward diode is connected to an oscillator with the tunnel diode employed therein so that its bias voltage may be changed with a signal, a frequency-mixer circuit taking the specific form of an amplitude modulator or a frequency modulator may be constructed.

(2) In a similar manner a frequency mixer taking the form of a frequency converter may also be formed.

(3) An amplifier, transducer, amplitude limit amplifier, switching element or the like may likewise be constructed.

Explaining one embodiment of this invention with reference to FIGURE 10, an oscillator 10 is provided having a tunnel diode TD and employing a resonance coil 11 and capacitor 12 which mainly determine its oscillation frequency. 13 is a by-pass capacitor and 14 a bias power source device for the tunnel diode. As shown in the embodiment of FIGURE 10, a backward diode BD is connected in the oscillator circuit in parallel to a tunnel diode through a coupling and direct current blocking capacitor 15. To the backward diode functioning as a transducer, is connected a signal source 17 through a transformer 16. 18 is high frequency choke coil giving a high impedance to the oscillation frequency of the oscillator 10 and 19 designates a by-pass capacitor. A coupling and direct current blocking capacitor 15 provides a high impedance to the signal frequency and to direct current. 20 is a bias power source device for the backward diode BD. In the embodiment of FIGURE 10, the backward diode characteristic varies in accordance with changing of the bias voltage by a signal from the signal source 17, and accordingly the resultant characteristic of the tunnel diode and backward diode changes with the signal as above described with reference to FIGURE 9. This changes the amplitude of the oscillation frequency of the oscillator 10, and thereby achieves a variety of frequency mixing commonly known as amplitude modulation. This thus obtained modulated signal may be picked by a coil 21 coupled to the coil 11. In this case, a new negative resistance characteristic curve resulting from the tunnel diode and backward diode is produced, and hence the oscillation frequency of the oscillator 10 itself is changed and amplitude modulation and frequency modulation are made at the same time. If, however, the next stage of the oscillator is properly formed, one or both outputs may be easily picked up.

FIGURE 11 and FIGURE 12 are variations of FIGURE 10.

In FIGURE 10, the signal source 17 is connected in parallel to the backward diode, but in FIGURE 11 it is in series but the other parts are quite the same, so that the corresponding parts are marked with the same numerals and the explanation of them is omitted for simplicity. In FIGURE 12, the signal source 17 is connected in parallel to the backward diode similarly to FIGURE 10, but in this embodiment the oscillator 10 forms a relexation oscillator with the transformer 16 omitted. The other parts are quite the same as those of FIGURE 10. Accordingly, the corresponding parts of this embodiment have been given as previously used in FIGURE 10.

Figure 13:
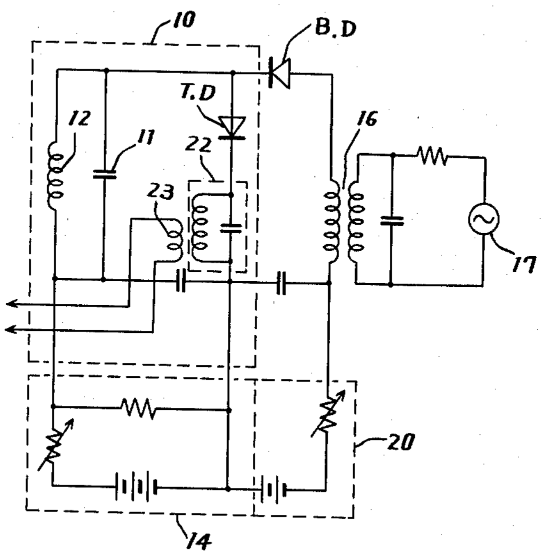
FIGURE 13 is an embodiment of this invention applied to a frequency converter.

FIGURE 13 illustrates another example of this invention applied to a frequency-mixer taking the form of a frequency converter, which is very similar to the circuit of the modulator shown in FIGURE 11. Therefore, the corresponding parts to FIGURE 11 are also marked with the same numerals. In this example, however, the oscillation frequency of the oscillator 10 is selected as the sum or difference of a frequency of an input signal source and a conversion frequency, a conversion signal oscillation circuit 22 being connected in series to, for instance, a tunnel idode TD by which ac onversion frequency signal is picked up from a coil coupled with the oscillation circuit 22. Generally the conversion frequency signal is an intermediate frequency signal.

Figure 14:
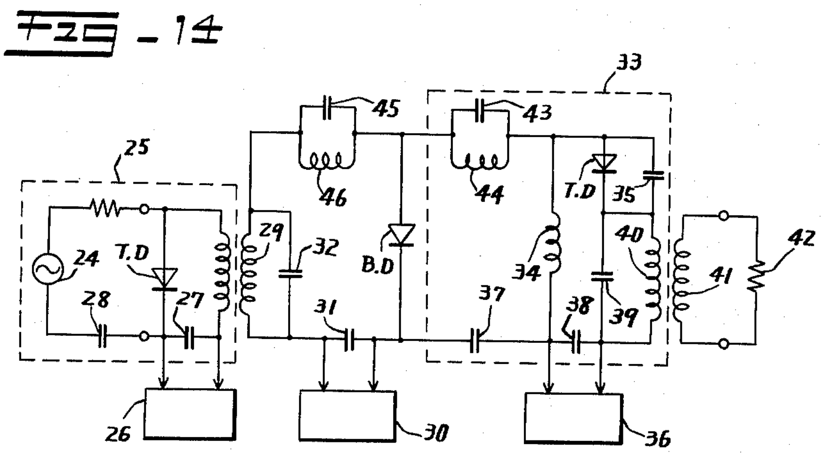
FIGURE 14 is an embodiment of this invention applied to a unidirectional amplifier.

FIGURE 14 illustrates a further embodiment of this invention applied to a one-way amplifier, in which 24 is a signal source and a tunnel diode TD is connected in parallel with the source, and thereby forming a first stage amplifier 25. 26 is a bias power source of the tunnel diode. 27 and 28 are respectively by-pass capacitors. The output of the amplifier 25 is added to a backward diode BD through a transformer 29. 30 is a bias power source of the backward diode. 31 is a by-pass capacitor and 32 a capacitor forming a resonance circuit together with the secondary coil of the transformer 29. Following the backward diode stage there is an oscillator 33 using a tunnel diode TD. 34 and 35 are respectively a coil and capacitor which determine the oscillation frequency of the oscillator. 36 is a bias power source of the tunnel diode. 37 and 38 designate by-pass capacitors respectively. An output circuit, which is formed by a capacitor 39 and coil 40, is provided in series with the tunnel diode, the capacitor 39 and the coil 40 being connected in parallel with each other. 41 is an output coil coupled with the coil 40, and 42 exemplifies the load. The output circuit is coupled to the oscillator 33 through a capacitor 43 and coil 44, whose constants are so selected as to cause them to be substantially in tune with the signal frequency, and hence the signal is prevented from being unnecessarily short-circuited by the coil 34. Furthermore, between the transformer 29 and backward diode BD a tuned circuit is provided formed by a capacitor 45 and coil 46 which is tuned to the oscillation frequency of the oscillator 33, and thereby prevents unnecessary feedback of the oscillation frequency to the input side.

According to the aforementioned circuit as shown in FIGURE 14, the backward diode, functioning as a transducer, is changed in its bias by the signal from the signal source 24, and accordingly if the tunnel diode of the oscillator is properly biased, its oscillation energy is modulated and rectified by the signal at the same time, and the rectified output is picked up at the load through the coils 40 and 41. On the contrary, when a signal is put into the circuit from the load side, the signal which is passing through the coils 40 and 41 is amplified by the tunnel diode but the signal is short-circuited by the coil 34, so that the signal from the load side does not enter into the input side. Therefore, a one-way amplifier is provided, the noise is decreased and the signal to noise ratio is improved.

This invention may also be employed with a tunnel diode functioning as a switching element. That is, in many cases tunnel diodes are used in pairs, and these diodes should have the same characteristics curves. But such uniform tunnel diodes are difficult to be obtained. In this case, if backward diodes are employed according to this invention, switching units of the same characteristic may easily be obtained by changing the bias of the diodes properly.

Although tunnel diodes have been used by themselves as amplifiers, the tunnel diode may be combined with a backward diode, according to this invention, and an amplifier obtained which may effect automatic gain control by changing the bias of the backward diode with an input signal.

As has been described with reference to FIGURE 9, various negative resistance characteristic curves may be obtained but since the negative resistance characteristic region is substantially symmetric with respect to its maximum conductance portion, namely at the mid-point of the negative region, an ideal amplitude limit amplifier may be obtained by effecting amplification in the negative region.

The above description has been made mainly with reference to the drawing wherein the polarity of a backward diode is connected reversely to that of a tunnel diode, but similar, although not as good, operation effects may be produced even if it is connected in the forward direction. It is, however, preferable to use the backward diode in the reverse direction as previously described.

As above described this invention may be applied very satisfactorily to various circuits in a very simple construction and it will be apparent to those skilled in the art that many modifications and variations may be effected without departing from the scope of the novel concepts of this invention.

We claim as our invention:

1. A negative resistance device comprising a tunnel diode having an anode, a backward diode having a cathode, and means connecting said tunnel diode to said backward diode in parallel therewith in a reverse conductive direction thereto, and means providing positive bias voltages to the anode of said tunnel diode and the cathode of said backward diode.

2. A negative resistance device comprising a tunnel diode having an anode, a backward diode having a cathode, and means including a capacitor connecting said tunnel diode in parallel with said backward diode for blocking said diodes from direct current flow therebetween, and means providing respective positive bias voltages to the anode of said tunnel diode and the cathode of said backward diode.

3. A modulator comprising an oscillator having a tunnel diode, a frequency determining circuit including an inductance coil and a capacitor connected to said diode, and a bias device supplying a predetermined bias voltage to said tunnel diode, a backward diode connected in parallel to said tunnel diode, a bias power source for providing a bias voltage to said backward diode, a circuit for blocking said diodes with respect to direct current, and a signal source for supplying a signal to a circuit including said backward diode, and means for preventing a current from said oscillator including said tunnel diode from flowing into said signal source.

4. A modulator comprising an oscillator having a tunnel diode, an oscillation circuit including an inductance coil and a capacitor connected to said diode, means for providing a predetermined bias voltage to said tunnel diode, signal source connected in parallel to said tunnel diode, a backward diode inserted between said tunned diode and said signal source, and means for providing a predetermined bias voltage to said backward diode.

5. A modulator comprising a relaxation oscillation circuit including a tunnel diode, an inductance coil connected in parallel thereto, a bias power source for supplying a predetermined bias voltage to said tunnel diode, a backward diode connected in parallel to said tunnel diode, a bias power source and a signal source connected in parallel to said backward diode, and a capacitor for blocking said tunnel diode from said backward diode with respect to direct current.

6. A frequency converter comprising a tunnel diode, an oscillation element including an inductance coil and a capacitor connected to said diode, a bias device for supplying a predetermined bias voltage to said tunnel diode, a backward diode connected in series with said tunnel diode, a bias device for supplying a predetermined bias voltage to said backward diode, a signal source for supplying a signal to said backward diode, and a tuning circuit for obtaining an intermediate frequency output signal.

7. An amplifier comprising a first tunnel diode, means biasing said first tunnel diode, a signal source of a current to be amplified, a backward diode connected to the output side of said tunnel diode, means biasing said backward diode, an oscillator consisting of a second tunnel diode connected in parallel with said backward diode, means biasing said second tunnel diode, and a tuned circuit connected to said second tunnel diode, a circuit interposed between said first tunnel diode and said backward diode tuned to the oscillation frequency of said oscillator, and a circuit inserted between said backward diode and second tunnel diode tuned to the frequency of said signal source.

8. A frequency mixer circuit comprising an oscillator having a tunnel diode, a transducer having a backward diode with negative conduction characteristics injecting a signal into said oscillator, means including a capacitor connecting said tunnel diode in parallel with said backward diode for blocking said diodes from direct current flow therebetween and a signal source supplying a positive signal to a cathode of said backward diode transducer.

9. A frequency mixer circuit comprising an oscillator having a tunnel diode, a connecting means connected to said tunnel diode, a transducer having a backward diode with negative conduction characteristics connected to said tunnel diode by said connecting means, a bias source supplying a positive voltage to a cathode of said backward diode, and a signal source supplying a signal to said backward diode varying said bias voltage to said backward diode.

10. A frequency mixer circuit comprising an oscillator generating a signal and having a tunnel diode, a connecting means connected to said tunnel diode passing said oscillator signal, a transducer having a backward diode with negative conduction characteristics connected to said tunnel diode by said connecting means, a bias source supplying positive voltage to a cathode of said backward diode, and a signal source supplying a signal to said backward diode varying said bias voltage to the backward diode.

11. A frequency mixer circuit comprising an oscillator generating a signal and having a tunnel diode, a connecting means connected to said tunnel diode passing said oscillator signal, a bias source supplying a voltage to said tunnel diode, a frequency determining means including an inductance coil and a capacitor connected to said tunnel diode with negative conduction characteristics, a transducer having a backward diode connected to said tunnel diode, by said connecting means, a bias source supplying voltage to said backward diode, and a signal source supplying a signal to said backward diode varying said bias voltage to the backward diode.

12. A frequency mixer circuit comprising a transducer having a backward diode with negative conduction characteristics, a bias source supplying positive voltage to a cathode of said backward diode, a signal source supplying a signal to said backward diode varying said bias source voltage supplied to the backward diode, a connecting means connected to said backward diode which resists said signal source, said signal source and said oscillator each having a tunnel diode connected to said transducer by said connecting means.

13. A frequency mixer circuit comprising an oscillator having a tunnel diode, a transducer having a backward diode, the anode of said backward diode being connected directly to the cathode of said tunnel diode, and a signal source supplying a positive signal to a cathode of said backward diode transducer.

14. A modulator comprising an oscillator generating a signal and having a tunnel diode, a connecting means connected to said tunnel diode, a transducer having a backward diode connected to said oscillator through said connecting means, a bias source supplying a bias voltage to said backward diode, and a signal source supplying a signal to said backward diode transducer whereby said backward diode transducer varies the amplitude of said oscillator signal.

(References on following page)

References Cited by the Examiner

UNITED STATES PATENTS

| | | | |
|---|---|---|---|
| 2,655,608 | 10/1953 | Valdes | 307—88.5 |
| 2,964,637 | 12/1960 | Keizer | 307—88.5 |
| 2,981,891 | 4/1961 | Horton | 307—88.5 |
| 2,997,604 | 8/1961 | Shockley | 331—107 X |
| 3,058,009 | 10/1962 | Shockley | 307—88.5 |
| 3,122,649 | 2/1964 | Roop | 307—88.5 |

OTHER REFERENCES

Tunnel Diode Manual, G.E. Pub. Lib. No. TK872-S4G4. (Copyright Mar. 20, 1961, page 10.)

ROY LAKE, *Primary Examiner.*

L. MILLER ANDRUS, ALFRED L. BRODY, *Examiners.*